United States Patent [19]

McNenney et al.

[11] 3,970,261
[45] July 20, 1976

[54] HANDLING TIRE MAKING MATERIALS

[75] Inventors: William McNenney, North Redington Beach, Fla.; John R. Sponseller, North Cantor, Ohio

[73] Assignee: The Goodyear Tire & Rubber Company, Akron, Ohio

[22] Filed: Sept. 29, 1975

[21] Appl. No.: 617,909

[52] U.S. Cl. .............................................. 242/55
[51] Int. Cl.² ...................................... B65H 75/02
[58] Field of Search ............... 242/55, 67.1 R, 67.2, 242/67.3 R

[56] References Cited
UNITED STATES PATENTS

| | | | |
|---|---|---|---|
| 1,611,400 | 12/1926 | Andrews | 242/55 |
| 2,340,267 | 1/1944 | Haase | 242/67.3 R |
| 2,480,704 | 8/1949 | Breth | 242/67.3 R |
| 3,012,735 | 12/1961 | Nebout | 242/67.3 R |

Primary Examiner—Edward J. McCarthy
Attorney, Agent, or Firm—F. W. Brunner; R. S. Washburn

[57] ABSTRACT

Handling of cut-to-length pieces of gum stock for use in building tires is improved by a method of and apparatus for lifting such pieces from a roller conveyor on which they travel lengthwise and transporting them in a direction normal to their own lengths and in parallel array on a multiple belt conveyor and thence to a winding cloth on which, still in parallel array, they are wound up in convolutions of the cloth about a core. At a tire building station the cloth is unwound from the core to place individual pieces conveniently at hand for use by the tire builder.

7 Claims, 5 Drawing Figures

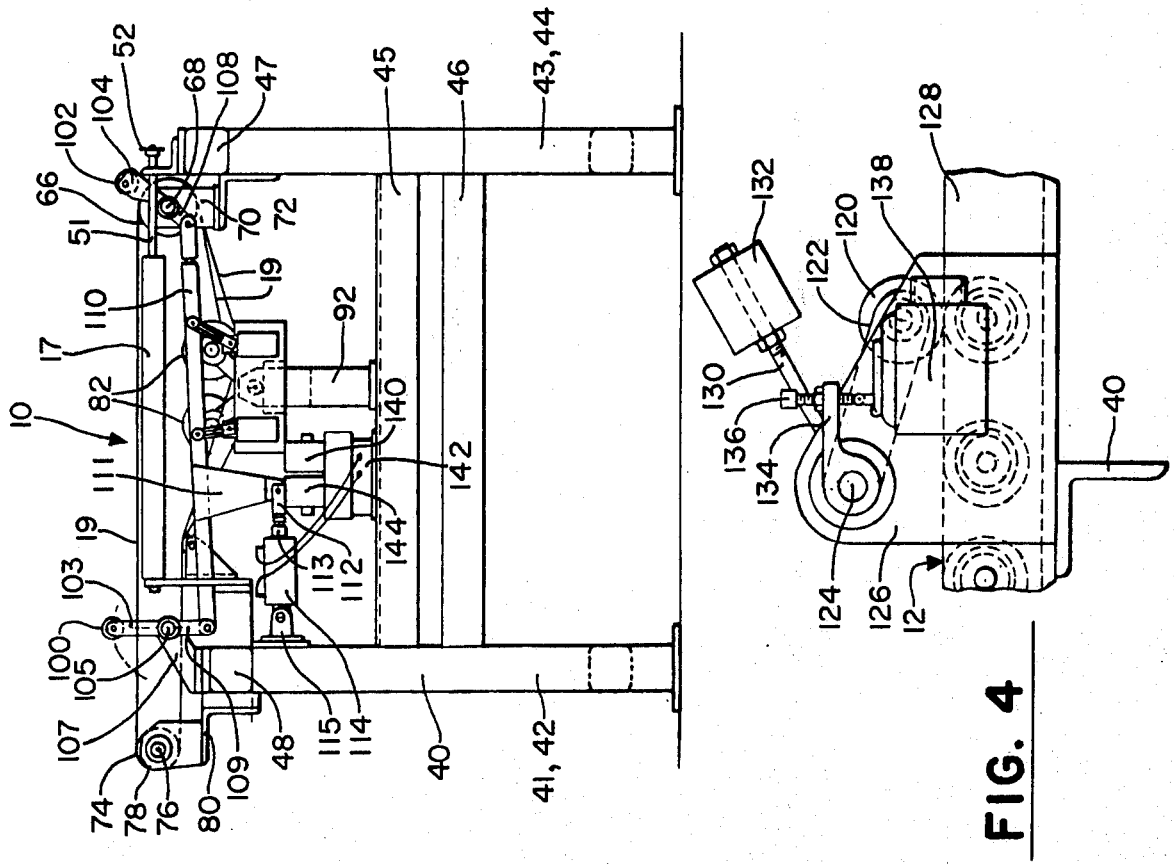

HANDLING TIRE MAKING MATERIALS

This invention relates to handling materials for building tires and particularly to handling cut lengths or pieces of gum stock after the same are prepared and before such pieces are built into tires.

Gum stock, as the term is used herein, will be understood to mean uncured rubber free of cord reinforcement prepared for building tires. Rubber will be understood to mean compounds of natural or synthetic material suitable for use in building tires.

The term "piece", as used herein, will be understood as meaning any of the cut-to-length strips commonly used in building tires. Examples of such pieces are apex strips, shoulder wedges, sidewall strips, and the like. Such pieces are usually extruded, disposed on a conveyor and carried thereon through a cutoff apparatus where they are cut to appropriate predetermined lengths.

Heretofore, it has been common and generally accepted practice to place cut-to-length pieces of gum stock manually on trays. The trays are hinged along one longitudinal edge in vertical stacks in which the individual trays can be opened like the pages of a book. These stacks of trays are sometimes referred to as "bear traps". Such bear traps are then transported from the location at which the cut lengths are produced to the vicinity of the tire building station. At the tire building station, the tire builder can then remove the cut lengths as required.

The bear traps, or stacks of trays, are awkward and difficult to handle, expensive, and have relatively limited capacity. Moreover, they require an undue amount of unproductive labor not only in the necessary movement of the bear traps from place to place but in the manual loading of cut pieces into the traps and the manual removal of the pieces from the trays by the tire builder.

The present invention aims to provide a method and apparatus for overcoming the foregoing disadvantages and for providing for improved handling of cut-to-length pieces of gum stock for building tires.

The foregoing and other objects and advantages are provided in accordance with the invention in the method of handling tire building components comprising moving cut pieces of gum stock in a direction parallel their lengths on first conveyor means, then lifting and moving said pieces perpendicular to said direction on second conveyor means while maintaining each piece parallel to said direction throughout its length, disposing said pieces seriatim on a winding cloth and winding said cloth and said pieces together about a core while maintaining said pieces parallel to each other and to said core.

In a further aspect, the objects of the invention are accomplished by an apparatus for handling lengths of tire building gum stock comprising a roller conveyor for moving said pieces in a direction parallel to their own length including a plurality of parallel coplanar rolls extending perpendicular to said direction and a plurality of endless belts, each belt having an upper reach extending parallel to said rolls and respectively between adjacent pairs thereof, and a pair of control rollers operable to depress each said upper reach below the tops of said parallel rolls and to disengage from said belts to elevate each said upper reach above the tops of said rolls to lift said pieces from said parallel rolls and to move them in a second direction perpendicular to their own lengths, and means for receiving said pieces seriatim parallel to their own lengths from said belts.

By way of illustration, but not of limitation, presently preferred embodiments of the invention showing the best mode now contemplated for practicing the invention will be described with reference to the drawings forming a part of the present specification and in which drawings:

FIG. 3 is a partial end elevation taken as indicated by the line 3—3 in FIG. 1;

FIG. 4 is an enlarged elevation view of a portion of the apparatus of FIG. 1; and FIG. 5 is an elevation view of an apparatus complementing the apparatus illustrated in FIG. 1.

Figure 1:
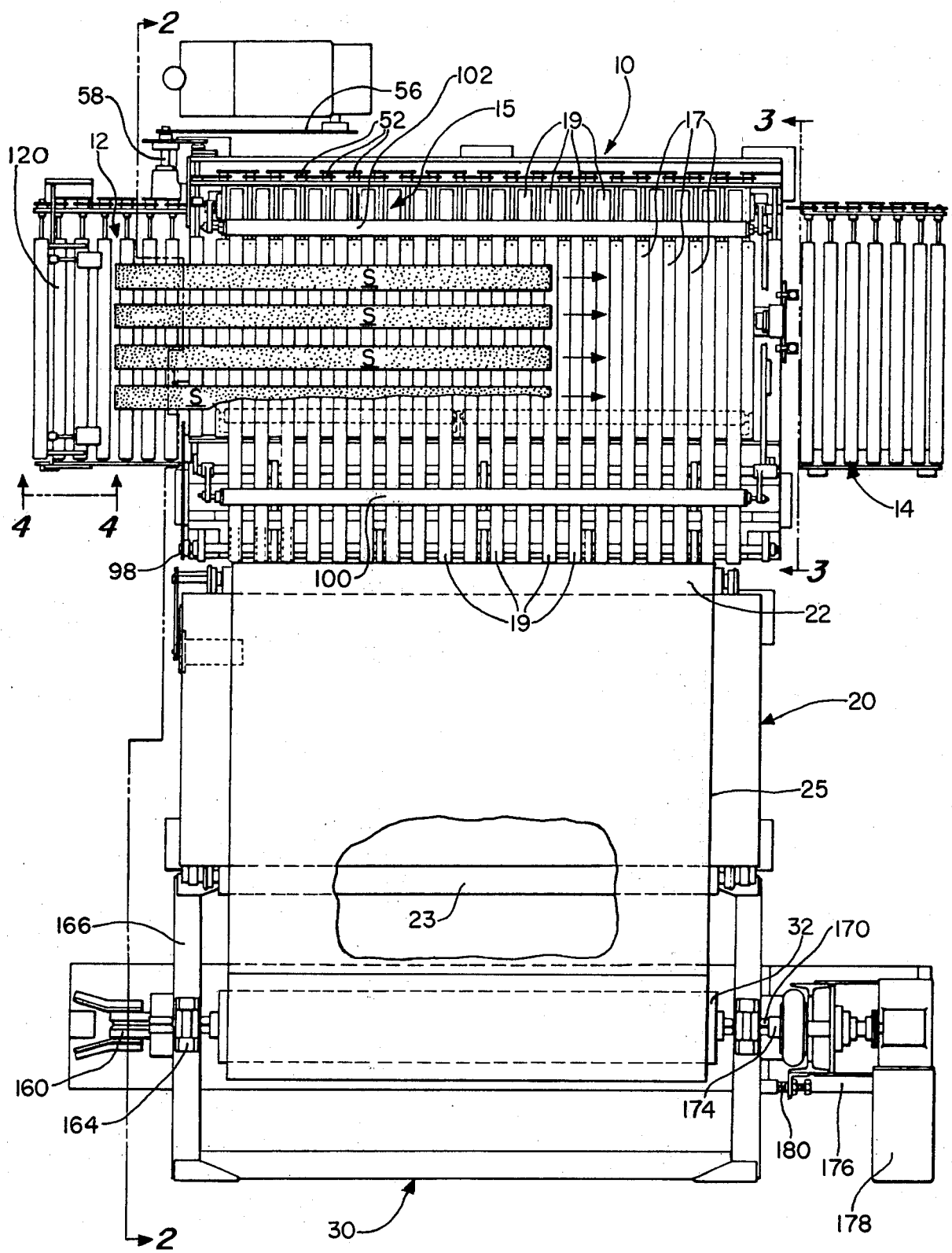
FIG. 1 is a plan view of an apparatus in accordance with the invention.
Figure 2:
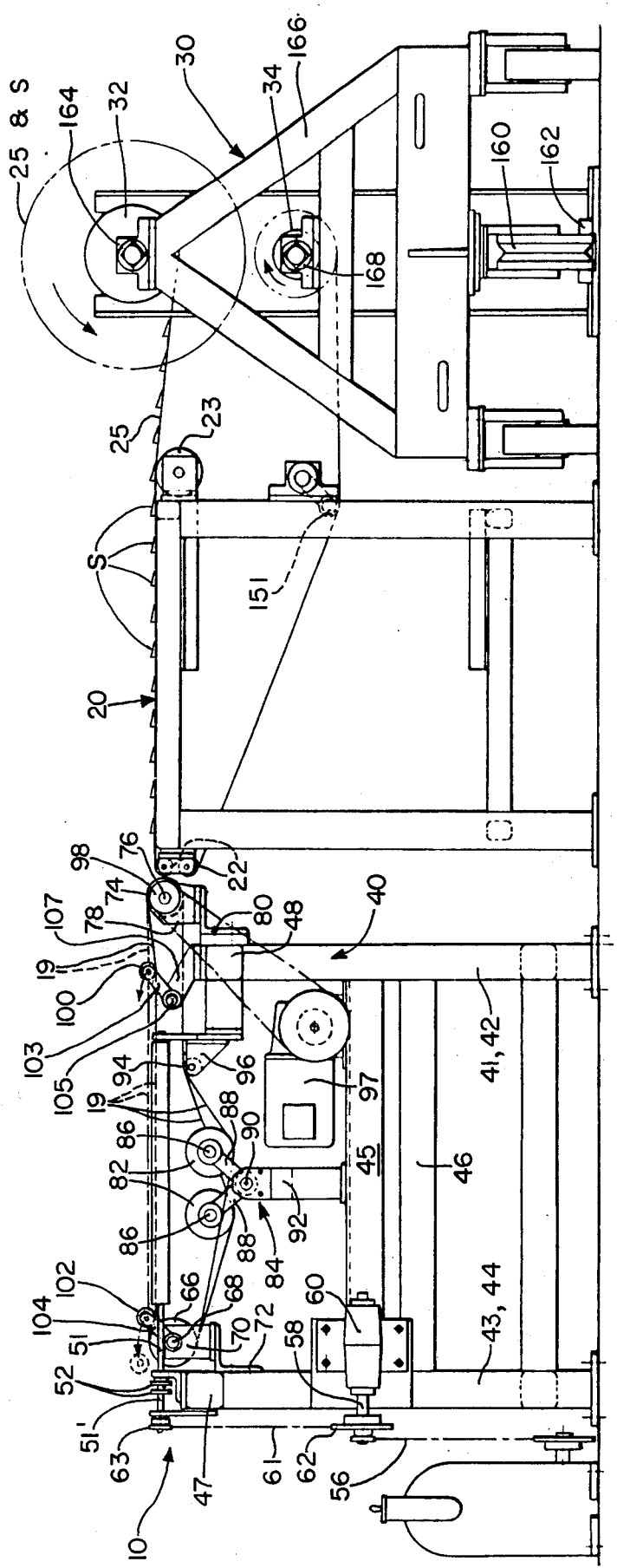
FIG. 2 is an end elevation of the apparatus taken as shown by the line 2—2 in FIG. 1.

The apparatus 10 illustrated in the drawings, particularly FIGS. 1 and 2, includes a first live roll conveyor 12 disposed at the entry end of the apparatus where the cut-to-length pieces S of gum stock are received from a conventional conveyor, not shown, on which they are carried from a cutoff means. A second live roll conveyor 14 is disposed at the exit end, to the right in FIG. 1, for a purpose presently to be pointed out.

Between the first and second live roll conveyors, there is disposed a bi-directional conveyor 15 which is termed herein a transveyor and which in accordance with the invention is capable of moving the cut pieces of gum stock first longitudinally in a direction parallel to their own length and then at an appropriate instant to lift such cut pieces from the live rolls 17 of the transveyor and to convey the cut pieces perpendicularly to their respective lengths on a plurality of belts 19. The transveyor 15 will be described in greater detail presently.

The apparatus 10 further includes a table assembly 20 which includes a pair of cloth-turning rolls 22, and a further roll 23 over which a winding cloth 25 is trained.

Cooperating with the apparatus 10 is a windup truck 30 carrying the core 32, about which the winding cloth 25 and the gum stock pieces S are wound up, and a spool 34 carrying a supply of winding cloth. The truck provides means for transporting the cut pieces of gum stock from the transveyor 15 to a tire building station.

Referring also to FIG. 2; the transveyor 15 comprises a suitable frame 40 including four vertical posts 41, 42, 43, 44, cross members 45, 46, and a pair of longitudinal rails 47, 48. A multiplicity of parallel rolls 17 are carried in bearings spaced equally along the respective rails. Each of the roll journals 51 carries a corotatable pair of sprockets 52 which are respectively connected by multiple loops of roller chain by which all of the rolls 17 are driven at equal surface speeds in the manner of conventional live roll conveyors. The rolls are driven by a longitudinal driving gear motor drivingly connected by the sprockets and chain drive 56 to an intermediate shaft 58 carried in a bearing 60 mounted on the post 43 and thence by the chain 61 from the sprocket 62 to a sprocket 63 corotatably mounted on the extended journal 51' of the first of the plurality of rolls. The surface speed of the rolls is greater than the lineal speed of the extrusion of the stock and than the speed of the cut pieces from the cutoff means. The greater speed moves the cut pieces into position in the transveyor 15, spacing them away from following pieces.

To provide for lifting and for moving the respective cut pieces S perpendicularly of their own lengths, the transveyor 15 includes the plurality of endless belts 19 trained about the belt pulleys 66 which are mounted rotatably on a longitudinal shaft 68 carried in bearings 70 supported on brackets 72 attached to the frame 40 on the drive side of the transveyor and about belt pulleys 74 corotatably mounted on the shaft 76 extending parallel and adjacent to the rolls 22 of the table 20 and supported on bearings 78 carried by the brackets 80 affixed to the frame 40. Each of the belts 19 is also engaged with a belt tension idler 82 carried rotatably on the belt takeup assembly 84.

The takeup assembly 84 includes a pair of parallel shafts 86 each mounted on a pair of swing arms 88 which arms swing on pivots 90 carried in the posts 92 fixed on the cross members 45 about an axis parallel to the pulley shafts 68, 76. Takeup idlers 82 on the respective shafts ride on alternate belts to maintain sufficient tension therein to raise the upper reach of each belt 19 above the tops of the rolls 17. The belt tension due to the takeup idlers, however, is such that the belt control rolls 100, 102 can depress the upper reach of each belt below the tops of the rolls sufficiently to clear the pieces S carried lengthwise on the rolls 17. An idler roll 94 carried rotatably in the brackets 96 fixed to the rail 48 directs the belts between the forward pulleys 74 and the takeup assembly 84.

The belts 19 of the transveyor are driven continuously by a gear motor drive 97 which is connected by flexible drive to a drive sprocket 98 corotatably mounted on the pulley shaft 76.

To lift the pieces of gum stock S, at an appropriate time, from the live roll conveyor thereby to interrupt their forward movement in the direction of their own length and to move them transversely in a direction perpendicular to their own length, control means including the two belt control rolls 100, 102 permit the belt tension (provided by the takeup assembly 84) to raise the upper reach of each belt 19 a small distance above the plane of the tops of the live rolls 17. When a piece or one group of pieces of gum stock have been carried over the pulleys 74 adjacent the turning rolls 22 and disposed successively on the winding cloth 25, the control rolls 100, 102 depress the upper reach of the respective belts 19 below the plane of the tops of the live rolls 17.

Referring to FIG. 3; the belt control roll 100 is carried rotatably by and between a pair of arms 103 which are fixed on a shaft 105 rotatably mounted in brackets 107 affixed to the rail 48. The belt control roll 102 is similarly carried rotatably on and between a pair of arms 104 which are fixed on the rear pulley shaft 68.

To swing the arms 103, 104 and thus move the rolls 100, 102, a crank 109 is fixed on the shaft 105 and extends downward to connect pivotally to an operating link 110. A crank 108 is fixed on the shaft 68 and extends from the shaft 68 to connect pivotally with the operating link 110.

The link 110 has an arm 111 rigidly affixed thereto the end of which is pivotally connected by a clevis 112 to the piston rod 113 of an operating cylinder 114 whose head end is pivotally carried in a bracket 115 attached to the frame 40. As can be seen in FIG. 3, when the piston rod 113 of the control actuating cylinder is extended, the link 110 is moved toward the right. The respective shafts 68 and 105 are rotated anticlockwise so as to move the respective control rolls 100, 102 downward against the upper reach of each belt 19 to depress each upper reach below the tops of the respective live rolls 17. Contrarywise, when the piston rod 113 is retracted, the link 110 is moved to the left, FIG. 3, causing the respective shafts and the arms 103, 104 to rotate clockwise. The control rolls 100, 102 move out of contact with the belts and permit the upper reach of each to rise above the tops of the respective live rolls.

To control the time at which the belts are raised to interrupt the forward motion of the cut lengths, means for sensing the position of a leading end or ends of the respective pieces is provided in the form of a riding roll 120, FIGS. 1 and 4, which is disposed immediately above one of the live rolls of the first conveyor 12. The riding roll is mounted rotatably between a pair of swing arms 122 carried on a pivot shaft 124 which is supported in end brackets 126 attached to the sides 128 of the conveyor 12. A pair of counter-weight arms 130 each having a counter-weight 132 adjustably located therealong provides control of the rise and fall of the riding roll. An actuating arm 134 corotatably attached to the pivot shaft 124 carries a screw stop 136 engageable with the plunger of a conventional limit switch 138 affixed on one of the end brackets 126. As the leading end of one or more pieces S causes the riding roll to lift, the limit switch provides a signal communicated to a pair of time delay switches (not shown). The first of the time delay switches is set to correspond to the time required for the piece or pieces to reach a position midway of the width of the cloth 25 at which time it energizes the solenoid 140 which in turn actuates the cylinder control valve 142 controlling pressurized air to the cylinder 114. The second of the time delay switches is set to allow the piece, or group of pieces, to be transferred to the winding cloth 25. When the second time delay switch then times out, the solenoid 144 actuates the cylinder control valve to reverse the cylinder 114 again depressing the upper reach of each belt below the level of the tops of the live rolls of the transveyor. As soon as the belt reaches are depressed, the transveyor is ready to receive the next piece or pieces entering over the conveyor 12 whereupon the operation described is repeated.

Where the pieces S move over the pulleys 74, it is important that the turning rolls 22 of the table dispose the winding cloth 25 sufficiently close to the belts 19 turning about the pulleys that the pieces can safely be transferred from the belts onto the winding cloth. This is accomplished by making use of a pair of turning rolls of small diameter about which the winding cloth is trained.

The table 20 which has previously been referred to may be of any suitable width, or span between the rolls 22 and the roll 23, as seen in FIG. 2, depending on space requirements. The table provides a plane smooth top surface over which the winding cloth 25 may move readily without interference and supports not only the turning rolls 22 and 23 referred to but also a spreader roll or bar 151 by which the winding cloth is spread to its full width free of wrinkles before passing about the turning rolls 22.

The previously mentioned truck 30 is provided with suitable wheels 160, a pair of which engage a track 162 to align the core 32 parallel to the longitudinal direction of the transveyor. The core is supported on suitable bearings 164 carried by the end frames 166 of the truck which end frames also support bearings 168 carrying the spool 34 about which a supply of winding cloth 25 is wound. The truck can be moved into the position shown, FIG. 1, thereby coupling a splined end 170 of the shaft which carries the core with a clutch 174 carried on a windup drive stand 176 and so coupled to a windup drive 178 by which the core is rotated to wind the windup cloth with pieces disposed thereon about the core 32. The endwise position of the truck, as seen in FIG. 1, is determined by a locator stop 180. If desired, conventional means may be provided to lock the truck in the position shown.

The previously mentioned second live roll conveyor 14 is provided to convey the pieces to an alternate apparatus 10 identical to that described in order to provide continuity of operation during the period in which the truck 30, having been filled, is removed, from the position shown in FIG. 1 and replaced by a truck to be filled, for transport of a supply of cut pieces to a tire building station.

Operation of the apparatus will have become apparent from the foregoing to persons skilled in the related arts. It will thus suffice here to briefly summarize the operation.

A truck 30 ready to receive a supply of pieces of gum stock is first positioned as seen in FIGS. 1 and 2. At that time the core 32 will be bare and the spool 34 will have a full supply of winding cloth 25 wound thereon. The operator passes a leading end of the winding cloth beneath the spreader roll 151 and upward about the turning rolls 22 and attaches the leading end of the windup cloth to the core. It is assumed that, taking advantage of the second transveyor apparatus referred to, the operation producing cut lengths of gum stock has not been interrupted. The operator will then activate the apparatus 10 by energizing the switch 138 of the sensing means that is, making it operative as previously indicated, whereupon a piece or group of pieces delivered over the conveyor 12 will travel over the live rolls of the transveyor to a position in alignment with the winding cloth at which time the first time delay switch times out, activates the solenoid 140, and thereby the cylinder control valve 142. The control actuating cylinder rod is retracted allowing the upper reaches of the respective belts to rise, interrupting the forward travel of the pieces, lifting and moving them transversely, perpendicular to their own lengths, and depositing the pieces one by one on the winding cloth as the cloth is wound on the core. The windup drive 178 is actuated concurrently with the elevation of the belts and moves the pieces S disposed on the cloth toward the core. When the second time delay switch times out, the upper reaches of the respective belts are again depressed and simultaneously the rotation of the core is stopped. The operation is repeated as described until the core is filled to capacity at which time the operator can transfer operations to the alternate unit.

Referring to FIG. 5; the core and truck 30 are wheeled to a tire building station where there is located a drive stand 190 and an unwind drive 192 to which the spool 34 is coupled to wind the winding cloth about the spool. The tire building station is provided with a table 194 having a pair of turning rolls 196. The tire builder takes the leading end of the winding cloth from the core, trains it about the turning rolls, over the table surface, and downward about the turning roll 196, under the spreader 197 and attaches it to the spool 34. The table 194 is provided with a bracket 200 which carries a feeler switch 201 having a dependent sensing arm 202. The switch 201 controls the drive 192 such that the winding cloth continues to be unwound from the core 32, by the rotation of the spool, until the feeler 202 detects the presence of a piece S on the winding cloth whereupon the drive 192 is deactivated. The tire builder can then manually remove the piece from the winding cloth for building into a tire. The winding cloth is then advanced until a next piece encounters the feeler and again stops the drive to the spool.

The invention provides notable advantages over the heretofore used methods and apparatus. The tedious manual transfer of cut-to-length pieces of gum stock from the conventional conveyor to the trays of a bear trap is entirely eliminated. The cost of the apparatus according to the invention is less than for the presently used bear trap. The pieces are made more readily available to a tire builder and are much less subject to distortion than in the manual handling as previously practiced. The number of pieces accommodated by one core truck is at least equal to and usually greater than in one bear trap, thereby requiring fewer resupply movements to the tire building station.

While certain representative embodiments and details have been shown for the purpose of illustrating the invention, it will be apparent to those skilled in the art that various changes and modifications may be made therein without departing from the spirit or scope of the invention.

What is claimed is:

1. The method of handling tire building components comprising moving cut pieces of gum stock in a direction parallel their lengths on first conveyor means, then lifting and moving said pieces perpendicular to said direction on second conveyor means while maintaining each piece parallel to said direction throughout its length, disposing said pieces seriatim on a winding cloth and winding said cloth and said pieces together about a core while maintaining said pieces parallel to each other and to said core.

2. A method as claimed in claim 1, further comprising moving said core with said cloth and said pieces thereon to a tire building station, unwinding said cloth with said pieces thereon progressively from said core over a table adjacent the tire building station to deliver said pieces one at a time for use in building tires.

3. In a process of preparing and delivering cut lengths of gum stock for building tires to a tire building station wherein said stock is extruded in at least one indefinite running length and is then cut seriatim in pieces of predetermined length and conveyed in a lengthwise direction, the improvement comprising interrupting movement of at least one of said pieces in said direction and moving said at least one piece perpendicularly of its own length while maintaining its own length parallel to said direction, and disposing said at least one piece on a winding cloth, and winding said cloth and a succession of said pieces seriatim in parallel array thereon about a cylindrical core whose axis is parallel to said direction.

4. A method as claimed in claim 3, wherein said interrupting is effected by lifting said at least one piece from a live roll conveyor carrying said pieces in said direction by a plurality of endless belts running perpendicular to said direction and parallel to the rolls of said conveyor.

5. A method as claimed in claim 4, wherein said pieces are accelerated by said live roll conveyor relative to the speed at which said stock is extruded.

6. Apparatus for handling lengths of tire building gum stock comprising a roller conveyor for moving said pieces in a direction parallel to their own length including a plurality of parallel coplanar rolls extending perpendicular to said direction and a plurality of endless belts, each belt having an upper reach extending parallel to said rolls and respectively between adjacent pairs thereof, and a pair of control rolls operable to depress each said upper reach below the tops of said parallel rolls and to disengage from said belts to elevate each said upper reach above the tops of said rolls to lift said pieces from said parallel rolls and to move them in a second direction perpendicular to their own lengths, and means for receiving said pieces seriatim parallel to their own lengths from said belts.

7. Apparatus as claimed in claim 6, said means for receiving said pieces from said belts comprising a windup cloth, and windup means including a rotatable core for receiving and winding thereabout said cloth with said pieces disposed seriatim thereon between successive convolutions of said cloth, said pieces extending parallel to said core.

* * * * *